United States Patent
Wieczorek

(10) Patent No.: US 8,440,081 B2
(45) Date of Patent: May 14, 2013

(54) QUICK DRAIN FILTER

(75) Inventor: Mark T. Wieczorek, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1260 days.

(21) Appl. No.: 11/835,376

(22) Filed: Aug. 7, 2007

(65) Prior Publication Data

US 2008/0047132 A1 Feb. 28, 2008

Related U.S. Application Data

(60) Provisional application No. 60/836,552, filed on Aug. 8, 2006.

(51) Int. Cl.
*F02M 37/22* (2006.01)
*B01D 27/00* (2006.01)
*B01D 35/00* (2006.01)

(52) U.S. Cl.
USPC ............ 210/248; 210/450; 210/438; 210/443

(58) Field of Classification Search .................. 210/234, 210/493.2, 450, 248, 455, 493.1, 433.1, 435, 210/437, 438, 441, 443
See application file for complete search history.

(56) References Cited

U.S. PATENT DOCUMENTS

| | | | |
|---|---|---|---|
| 4,619,764 A | 10/1986 | Church et al. | |
| 4,906,365 A | 3/1990 | Baumann et al. | |
| 5,098,559 A | 3/1992 | Mack et al. | |
| 5,468,386 A | 11/1995 | Ardes | |
| 5,520,801 A * | 5/1996 | Gerber et al. | 210/130 |
| 5,718,825 A | 2/1998 | Greive et al. | |
| 6,068,762 A | 5/2000 | Stone et al. | |
| 6,308,836 B1 * | 10/2001 | Guichaoua et al. | 210/440 |
| 6,506,303 B1 | 1/2003 | Gustafsson et al. | |
| 6,543,625 B1 | 4/2003 | Le Roux et al. | |

(Continued)

FOREIGN PATENT DOCUMENTS

WO WO 2004/069373 8/2004

OTHER PUBLICATIONS

International Search Report for international application No. PCT//US2007/075512, dated Dec. 27, 2007 (1 page).

(Continued)

*Primary Examiner* — Duane Smith
*Assistant Examiner* — Madeline Gonzalez
(74) *Attorney, Agent, or Firm* — Hamre, Schumann, Mueller & Larson, P.C.

(57) ABSTRACT

An apparatus, system, and method for a quick-drain filter includes a cylindrical filter element, a cylindrical interior volume disposed axially through the element, an end plate disposed on an axial end of the element, and a housing within which the element and end plate are disposed, the housing and element having a common axis. A stand pipe is disposed axially through the housing and configured to extend into the interior volume. A service drain passage is disposed at an axial end of the housing, the drain passage being configured to be disposed axially adjacent the end plate, and a plug is disposed on the end plate, the plug being configured to plug the drain passage.

20 Claims, 23 Drawing Sheets

U.S. PATENT DOCUMENTS

| | | |
|---|---|---|
| 6,910,692 B2 | 6/2005 | Malone |
| 7,572,306 B2 | 8/2009 | Hawkins et al. |
| 2002/0100720 A1 | 8/2002 | Jainek |
| 2002/0108897 A1 | 8/2002 | Pavlin et al. |
| 2003/0127384 A1 | 7/2003 | Kapur |
| 2004/0206682 A1 | 10/2004 | Bassett et al. |
| 2005/0279958 A1 | 12/2005 | Baumann |
| 2006/0118476 A1 | 6/2006 | Weindorf et al. |

OTHER PUBLICATIONS

Written Opinion of the International Searching Authority for international application No. PCT/US2007/075512, dated Dec. 27, 2007 (4 pages).

Final Office Action for co-pending U.S. Appl. No. 11/835,370, mailed Sep. 27, 2011.

* cited by examiner

QUICK DRAIN FILTER

PRIORITY CLAIM

This application claims priority to provisional patent application No. 60/836,552, filed 8 Aug. 2006, for "Quick Drain Filter System," incorporated herein in its entirety.

BACKGROUND

1. Field of the Invention

This invention relates to the field of filter cartridges, elements, and compete filters for fluids flowing in hydraulic motors or apparatuses, and in particular to those filters whose elements need to be replaced from time to time.

2. Description of the Related Art

Fluid filters are used in a wide variety of applications. For example, in the automotive and general engine industry, they are used to filter fuel, coolant, oil and other lubricants, water, and other fluids, in various components of the engine. One example of a filter might be a typical cylindrical filter cartridge composed of a filter medium that can be constructed of, e.g., paper, cardboard, felt, melt-spun, or other media, often a material which can be incinerated when the element is replaced to reduce waste. End plates typically constructed of plastic, are usually joined to the element.

Such filter cartridges are installed inside filter feed troughs or housings, often in such a way as to cooperate with a center tube or standpipe, which can consist of one or more pieces. In order to ensure sealing during filtration, elastomeric sealing rings are often arranged between center tube and flanges.

Problems often arise during replacement of the element/cartridge, given that fluid still resides in the filter housing and in empty volumes within the cartridge (such as the hollow center of a cylindrical element) and in the element media itself. This often results in dripping when the element is removed, splashing of fluid when a new cartridge is installed, and mixture of dirty fluid with clean fluid.

The present state of the art yields some designs in which the filter opens a port or valve to allow fluid to drain out of the housing when the filter is removed. The drained fluid flows to another reservoir, such as the fuel tank, oil sump, coolant reservoir, etc. One problem with current designs is a slow drain rate and expense of the large gaskets or complex valves needed to implement the system. A design is needed in which the drain rate is increased through a more open flow path, at reduced cost and complexity.

SUMMARY OF THE INVENTION

The present invention has been developed in response to the present state of the art, and in particular, in response to the problems and needs in the art that have not yet been fully solved by currently available designs. Accordingly, the present invention has been developed to provide an apparatus, system, and method for a quick-drain filter that overcome many or all shortcomings in the art.

In one aspect of the invention, a quick drain fluid filter apparatus includes a filter cartridge having an axis and a radius, and a plug protrusion disposed on an axial end of the cartridge with an inner radius sized such that it abuts a stand pipe extending through the cartridge when the cartridge is installed in a housing, the plug extending radially outward from the inner radius.

In a further aspect of the invention, a quick-drain filter apparatus includes a filter cartridge, a housing, a service drain passage disposed in the housing, and a plug disposed within the passage.

In a further aspect of the invention, a quick drain filter system includes a cylindrical filter element, a cylindrical interior volume disposed axially through the element, an end plate disposed on an axial end of the element, a housing within which the element and end plate are disposed, the housing and element having a common axis, a stand pipe disposed axially through the housing and configured to extend into the interior volume, a service drain passage disposed at an axial end of the housing, the drain passage being configured to be disposed axially adjacent the end plate, and a plug disposed on the end plate and configured to plug the drain passage.

In a further aspect of the invention, a method of servicing a quick drain filter apparatus includes providing a housing, a cylindrical filter cartridge disposed in the housing, a cylindrical interior volume in the filter cartridge, a stand pipe disposed axially in the housing and through the interior volume, a service drain passage disposed at an axial end of the housing extending radially outward from the stand pipe, and a drain passage plug disposed in and plugging the drain passage, removing the cartridge and plug, and installing a second cartridge and plug.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. The following more detailed description of the embodiments of the apparatus, system, and method of the present invention is not intended to limit the scope of the invention as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
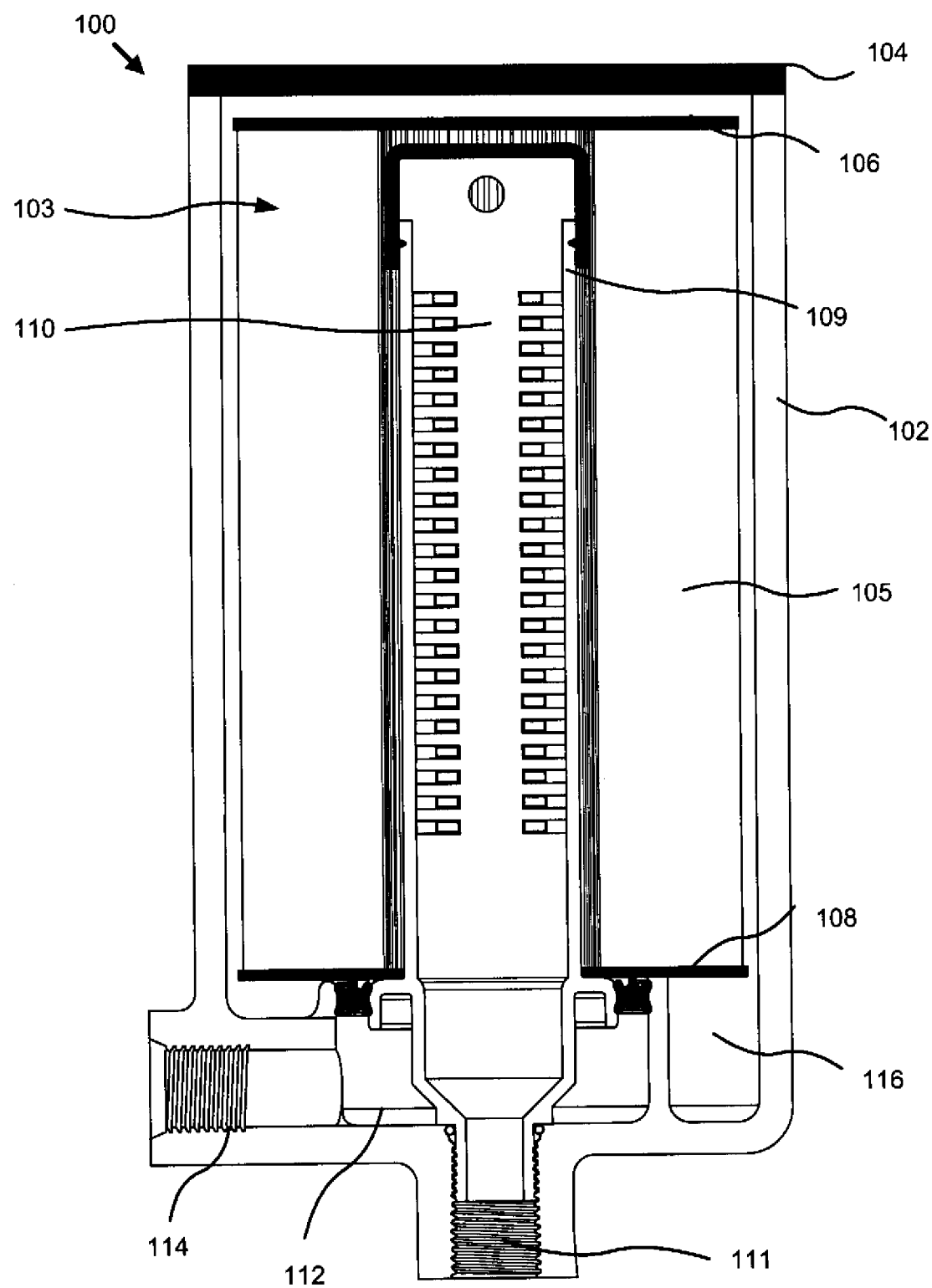
FIG. 1 is a schematic cross-sectional view of an embodiment of a quick-drain filter apparatus according to the present invention.
Figure 2:
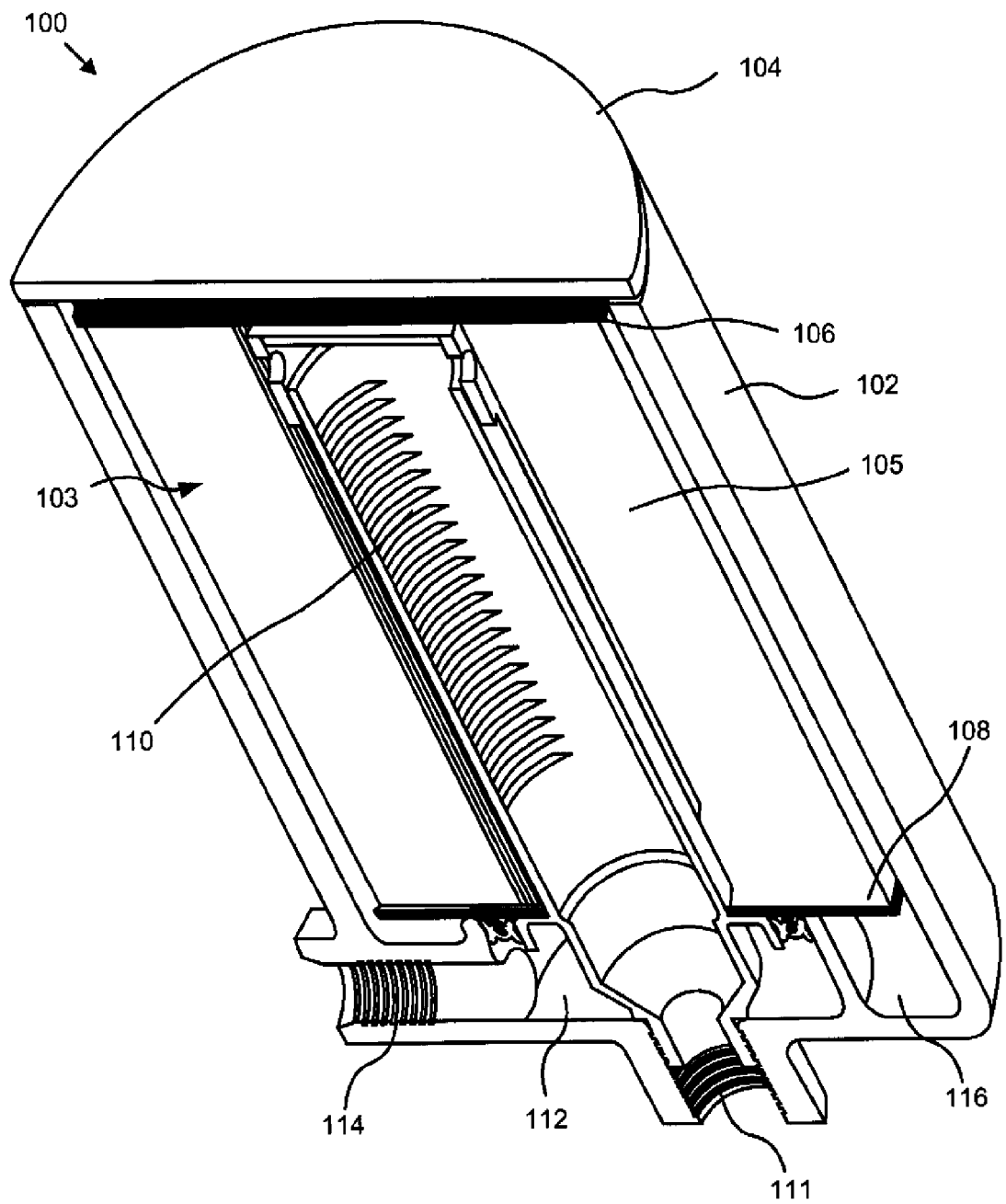
FIG. 2 is a schematic, cross-sectional, perspective view of the apparatus of FIG. 1.

FIGS. 1 and 2 show a quick-drain filter apparatus 100 according to the invention in which a cylindrical housing 102 is configured to house a cylindrical filter cartridge 103. The filter cartridge 103 comprises a filter element 105, a top end plate 106, and a bottom end plate 108. A cylindrical interior volume or chamber 110 is formed through the element 105 in an axial direction. Many filters have center posts defining and strengthening the center volume. Further detail of the end plate 108 is described below.

The housing 102 comprises a cylindrical wall, a lid 104, an inlet chamber 116 (extending throughout the housing on the outside of the cartridge 103), a service drain sump 112, and a service drain port 114. A stand pipe 109 extends into the interior volume 110. In operation, dirty fluid, such as fuel from a fuel tank, coolant from a reservoir, water, or other fluid, enters the filter 100 through an inlet (not shown), enters the inlet chamber 116, and, pressurized, is forced through the element 105 (often including a center post). Now filtered, the clean or filtered fluid enters the stand pipe 109, the interior of which serves as a clean fluid passage, and down through a clean fluid outlet 111 From there the fluid is transported to an engine, fuel injectors, cooling system, or other clean fluid application.

When the element 105 becomes plugged or otherwise due for replacement, the lid 104 is removed and the cartridge 103 is lifted out of the housing 102. That action opens a drain passage such that much of the fluid left in the cartridge 103 and housing 102 drains into the sump 112 and thence to the drain port 114. Given that most or all of such fluid left in the housing and element being replaced will be dirty, and any clean fluid will become contaminated through contact with the dirty fluid, the drain port 114 will lead back to the fuel tank or other source of dirty fluid, as will be apparent to those skilled in the art in light of this disclosure.

Figure 3:
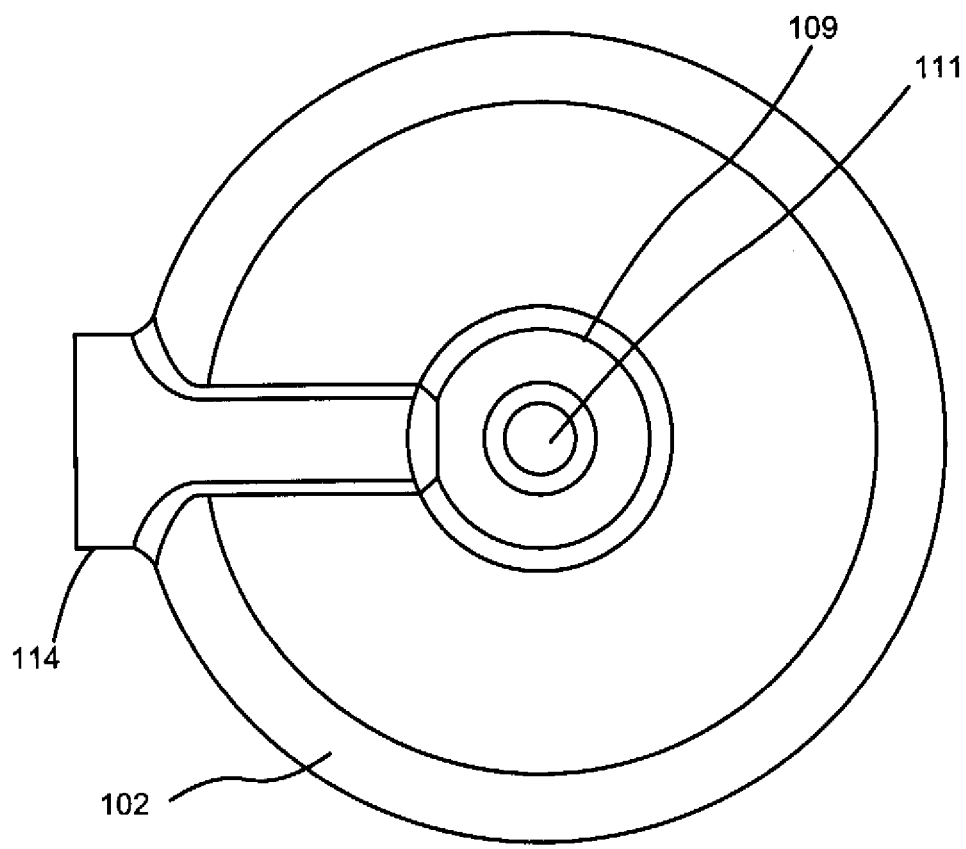
FIG. 3 is a bottom plan schematic view of another embodiment of a quick-drain filter apparatus according to the present invention.

FIG. 3 shows a bottom view of a filter apparatus according to the present invention functionally equivalent to the apparatus 100, with a housing 102, stand pipe 109, clean fluid outlet 111, and drain port 114.

Figure 4:
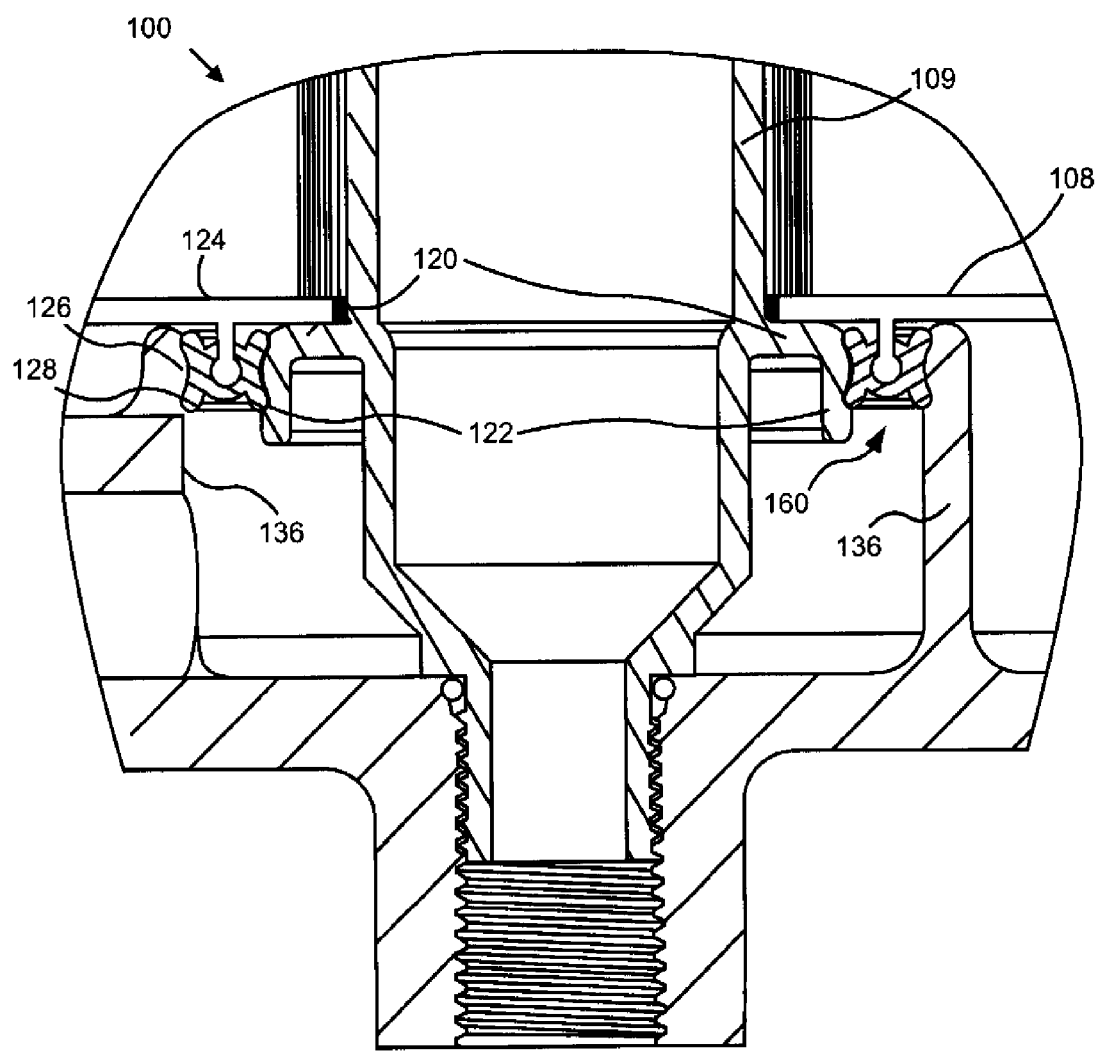
FIG. 4 is a partial cross-sectional view of the apparatus of FIG. 1.

FIG. 4 shows a portion of the apparatus 100 in more detail. As shown, an annular plate 120 extends radially from the stand pipe 109 directly beneath the end plate 108. The plate 120 may be considered part of the stand pipe 109, since it is integral therewith, though for definition purposes the two are considered separately here. The shelf 120 bends at right angles into a flange 122, which serves as the inner edge of an annular drain passage 160 defined on the radial inside edge by the flange 122 and on the radial outside edge by a housing member 136. The annular drain passage 160 is spaced radially away from the stand pipe 109, giving the passage a greater circumference and thus greater flow area (recall that this area increases with the square of the radius). This opens up the passage 160 and aids the drain rate of the fluid from the housing 102 when the cartridge 103 is removed from the housing (FIGS. 1, 2). The flow rate is thus limited by the diameter of the drain port 114 and associated plumbing, rather than the interface geometry.

"Radial" and "radius" as used herein mean not only radii in cylindrical applications, but any distance from an axis. The radius of the passage 160 and other components of the apparatus may or may not be constant, i.e., their shape may be irregular.

When the filter cartridge 103 is in place in the housing 102, the drain passage 160 should be plugged or sealed for the filter to function properly, as will be apparent to those skilled in the art in light of this disclosure. In the embodiment shown in FIG. 4, this is done by means of an annular plug arrangement comprising an annular barb 124 attached to or integral with the end plate 108 and extending axially into the drain passage 106. An annular gasket 126 constructed of rubber or other flexible material is attached to the barb 124. In this embodiment, the gasket 126 contains four protrusions or lobes 128 which install relatively easily over the barb 124. Upon installation of the cartridge 103 into the housing 102, the lobes 128 press against the flange 122 and member 136, plugging and sealing the passage 160, preventing drainage during filter operation as well as sealing the clean side of the filter from the dirty side.

As can be seen in FIG. 4, the barb 124 is thicker at its edge (a ball end) to enhance mechanical attachment to the gasket 126, which fits tightly onto the barb 124 to prevent it from coming off the barb 124 during cartridge removal or due to pressure in the housing 102. As will be apparent to those skilled in the art in light of this disclosure, various other arrangements are possible, such as making the barb a straight axial protrusion from the end plate 108 and fastening a gasket to it through adhesion and/or pressure. As described below, the axial protrusion itself may comprise the plug, filling the entire passage without additional gasket material. Other arrangements are possible while remaining within the scope of the invention, including separating the drain passage plug from the end plate and attaching it thereto, or removing it from the drain passage separately when the cartridge is removed, as discussed below.

The annular plate 120 can also be modified in various ways and given various shapes, to the point of comprising one or more elongated protrusions from the stand pipe rather than an annular structure (one embodiment of which is described below). The precise structure of the protrusion extending from the stand pipe, or even its existence, matters less than that at least a portion of the drain passage is located away from the center axis of the filter apparatus. As will be apparent to those skilled in the art in light of this disclosure, the concept has wide application in a variety of filters, which need not necessarily be cylindrical or have a stand pipe, simply that they have or be given an axis and that the drain passage, be it an annular passage, one or more holes, or other structure, be spaced from the axis to increase its flow area.

Figure 5:
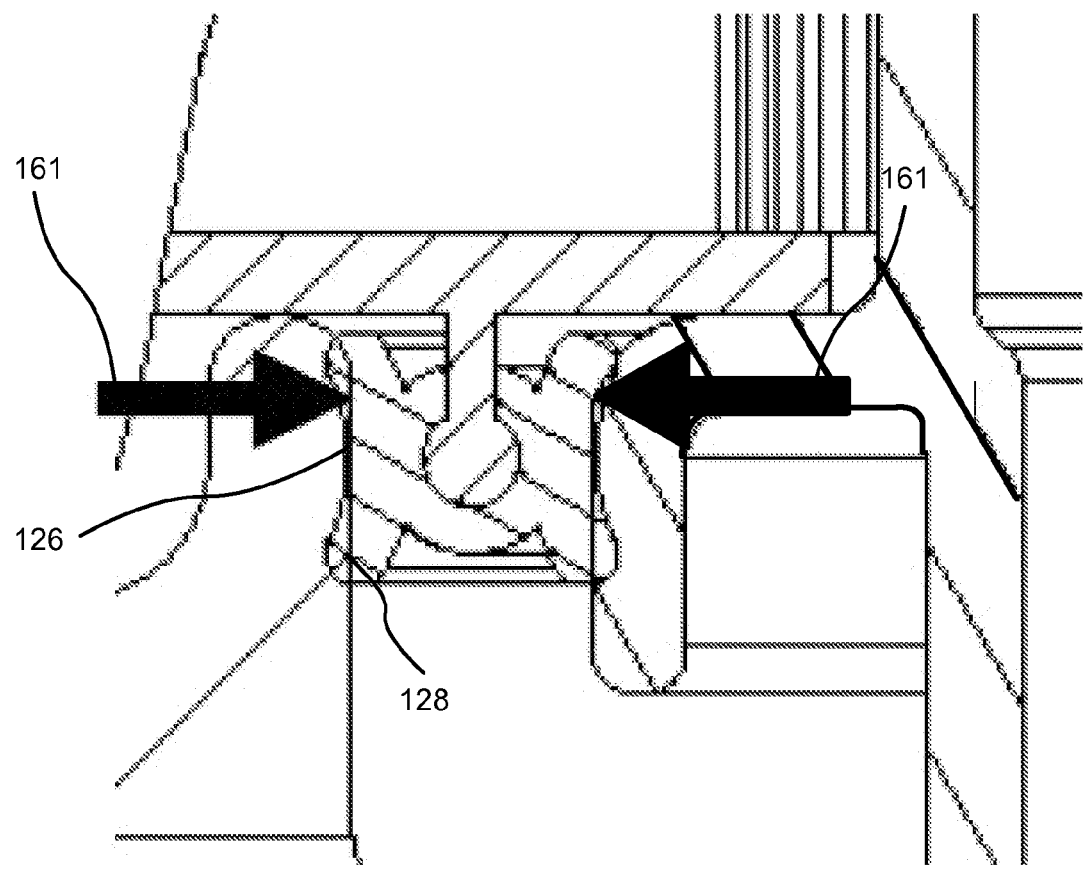
FIG. 5 is a partial cross-sectional view of the apparatus of FIG. 1, showing pressure direction.

The four-lobe gasket 126 provides effective sealing both in pressure and suction filter applications. The arrows 161 in FIG. 5 show the forces acting on the gasket 126, and particularly its upper lobes 128, in a pressure filter application. The pressures are different in a vacuum filter application, as described below, with the lower lobes 128 taking the brunt of the force.

Figure 6:
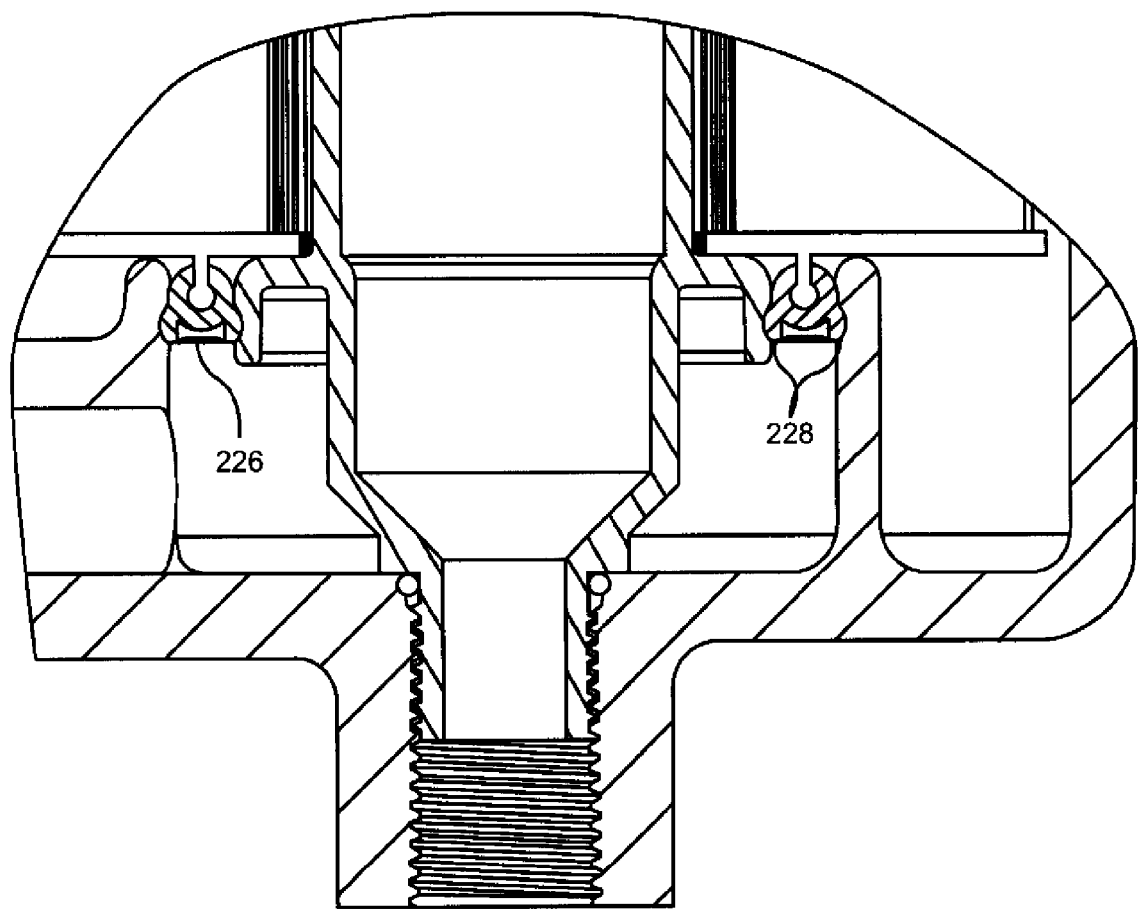
FIG. 6 is a partial cross-sectional view of another embodiment of a quick-drain filter apparatus according to the present invention.
Figure 7:
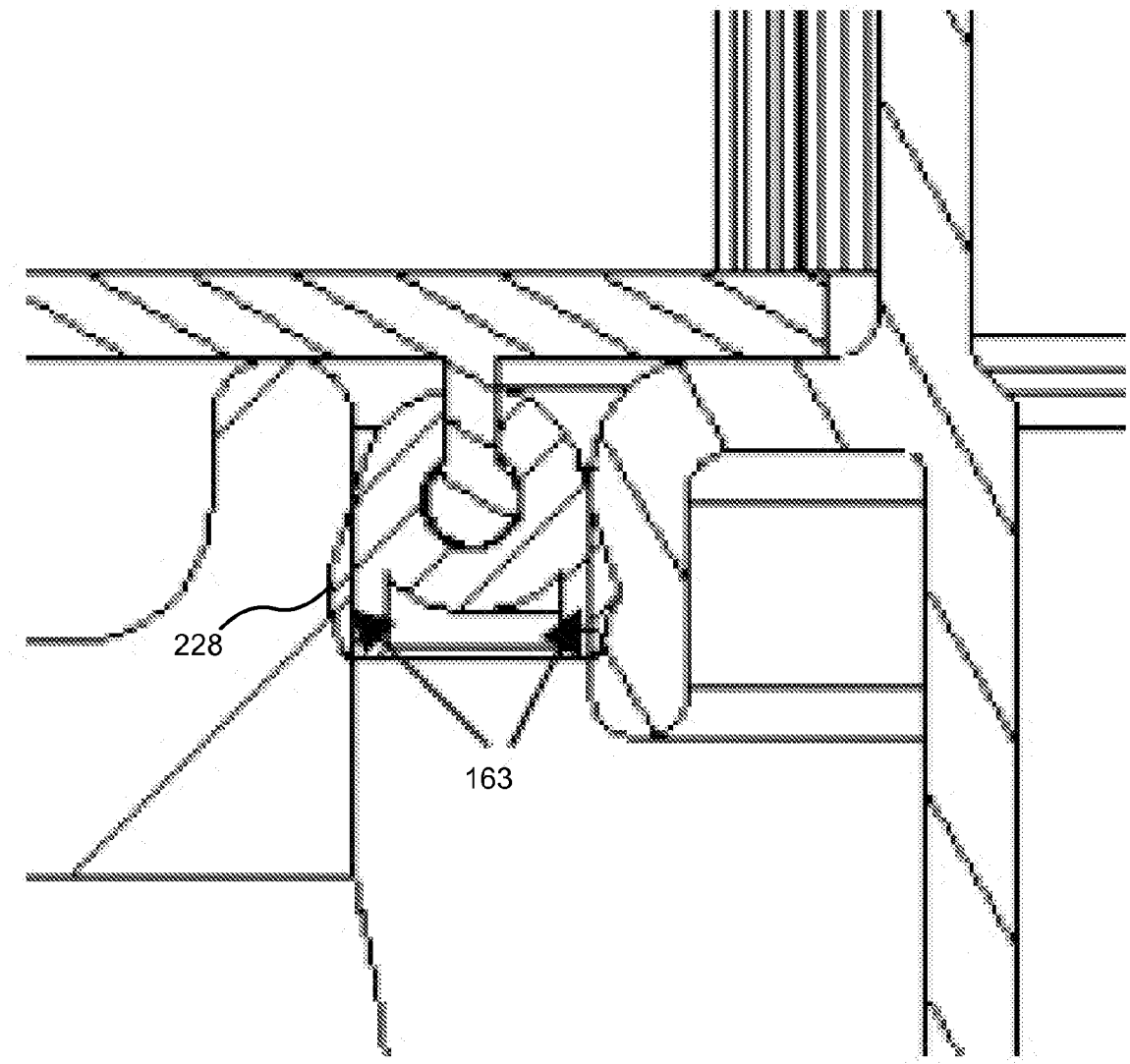
FIG. 7 is a partial cross-sectional view of the apparatus of FIG. 6, showing pressure direction.

The gasket 226 shown in FIG. 6, having only two lower lobes 228, may be used for vacuum filter applications, dispensing with upper lobes since the force in such an application, as shown by the arrows 163 in FIG. 7, primarily impacts the lower lobes 228.

In some high-pressure applications, a significant force will act on the gasket plugging the drain passage such that it may tend to be dislodged from the drain passage. Though the barb/gasket plug arrangement shown in FIG. 4, and other plug or gasket constructions, are capable of preventing the dislodging of the plug in many cases, the addition of structure supporting the plug can be beneficial for higher pressures.

Figure 8:
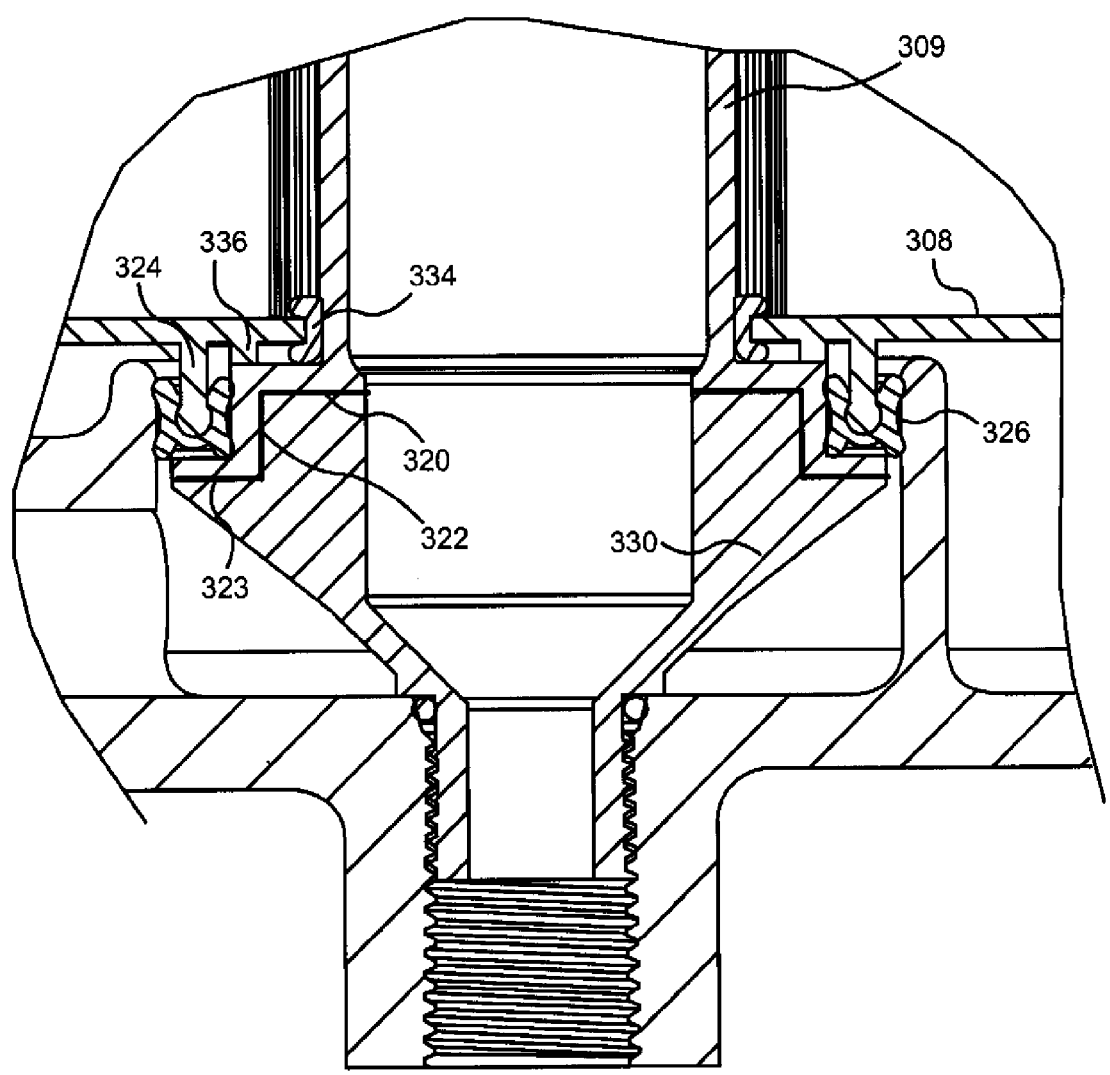
FIG. 8 is a partial cross-sectional view of another embodiment of a quick-drain filter apparatus according to the present invention.
Figure 9:
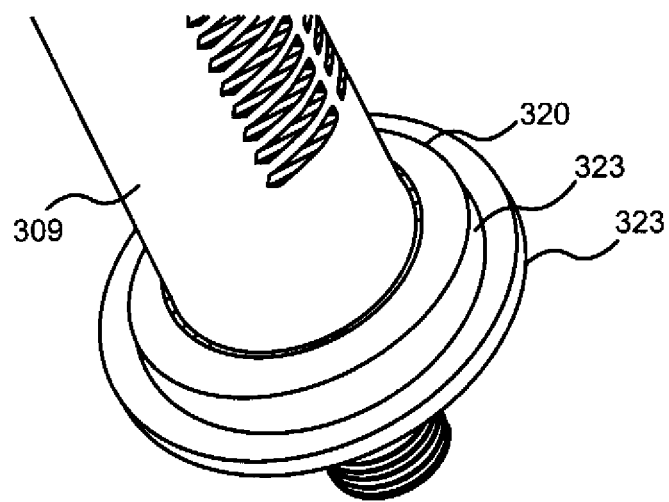
FIG. 9 is a perspective view of the stand pipe of the apparatus of FIG. 8.
Figure 10:
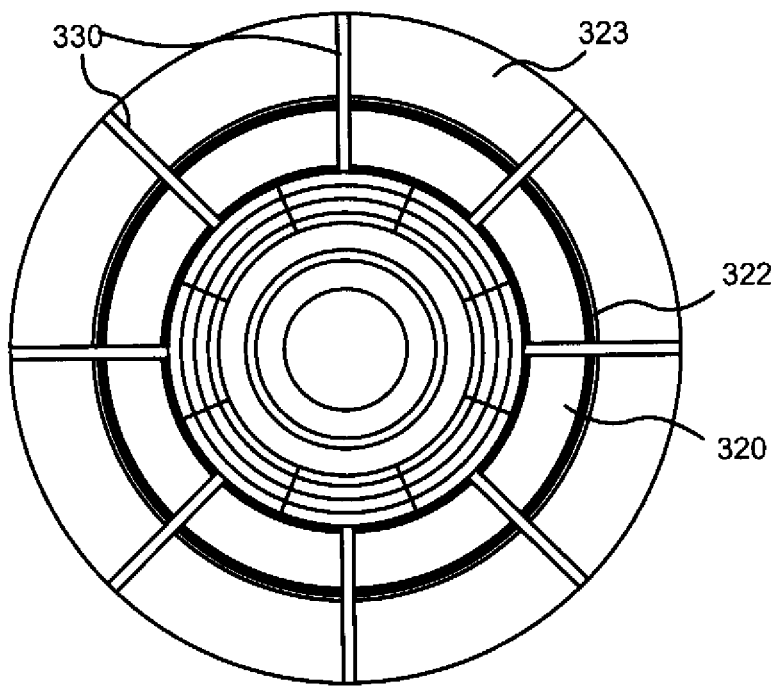
FIG. 10 is a bottom plan view of the stand pipe of the apparatus of FIG. 8.

FIGS. 8-10 show one embodiment of such support structure, in this case a support shelf 323, which extends from a flange 322, equivalent to the flange 122, to underlie and provide support to the barb 324 and gasket 326 (FIG. 8). The annular plate 320, together with the flange 322 and 323, are supported in their turn by a plurality of ribs 330, which extend radially from the stand pipe 309.

Alternatively, the support shelf 323 may be eliminated, with the ribs 330 themselves providing support for the plug. The number of ribs may have to be increased to lessen the space between them for support purposes. Other support structures are possible while remaining within the scope of the invention, including making them part of the housing rather than extending from the stand pipe, allowing standard-shape standpipes to be used.

FIG. 8 also shows a secondary gasket or grommet 334 which is placed on the interior edge of the end plate 308 in sealing engagement with the stand pipe 309. The gasket 334 further improves clean-to-dirty side sealing, and also provides a stand pipe wiping function, i.e., remaining in contact with the stand pipe 309 from top to bottom as the filter cartridge is installed into the housing, wiping and cleaning debris off the stand pipe 309. A protrusion 336 extends axially from the end plate 308 to support the plate, given that space between the end plate 308 and plate 320 is required to accommodate the gasket 334.

Figure 11:
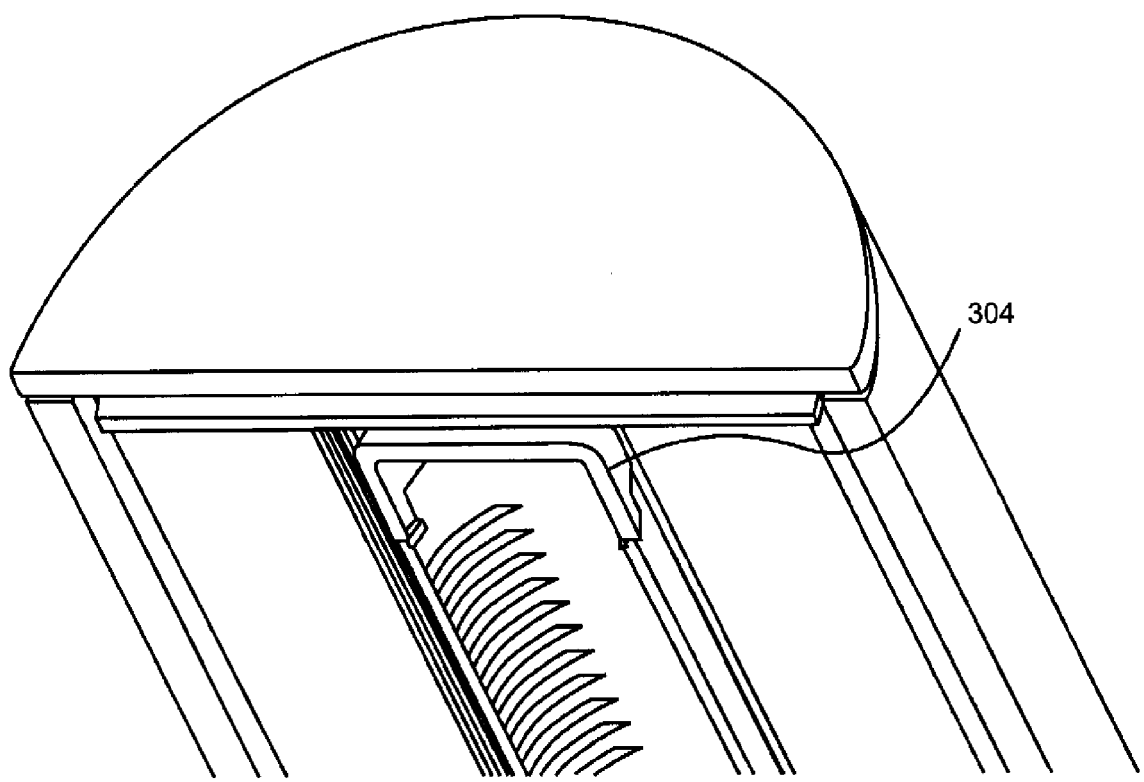
FIG. 11 is a partial, cross-sectional, perspective view of the apparatus of FIG. 8.

A debris cap 304, shown in FIG. 11, can be installed on the top of the stand pipe to prevent dirt and other debris from falling into the clean fluid passage of the stand pipe during a change of the filter cartridge. The debris cap 304 can be radially co-extensive or slightly less extensive than the stand pipe to allow the wiping function of gasket 334.

Figure 12:
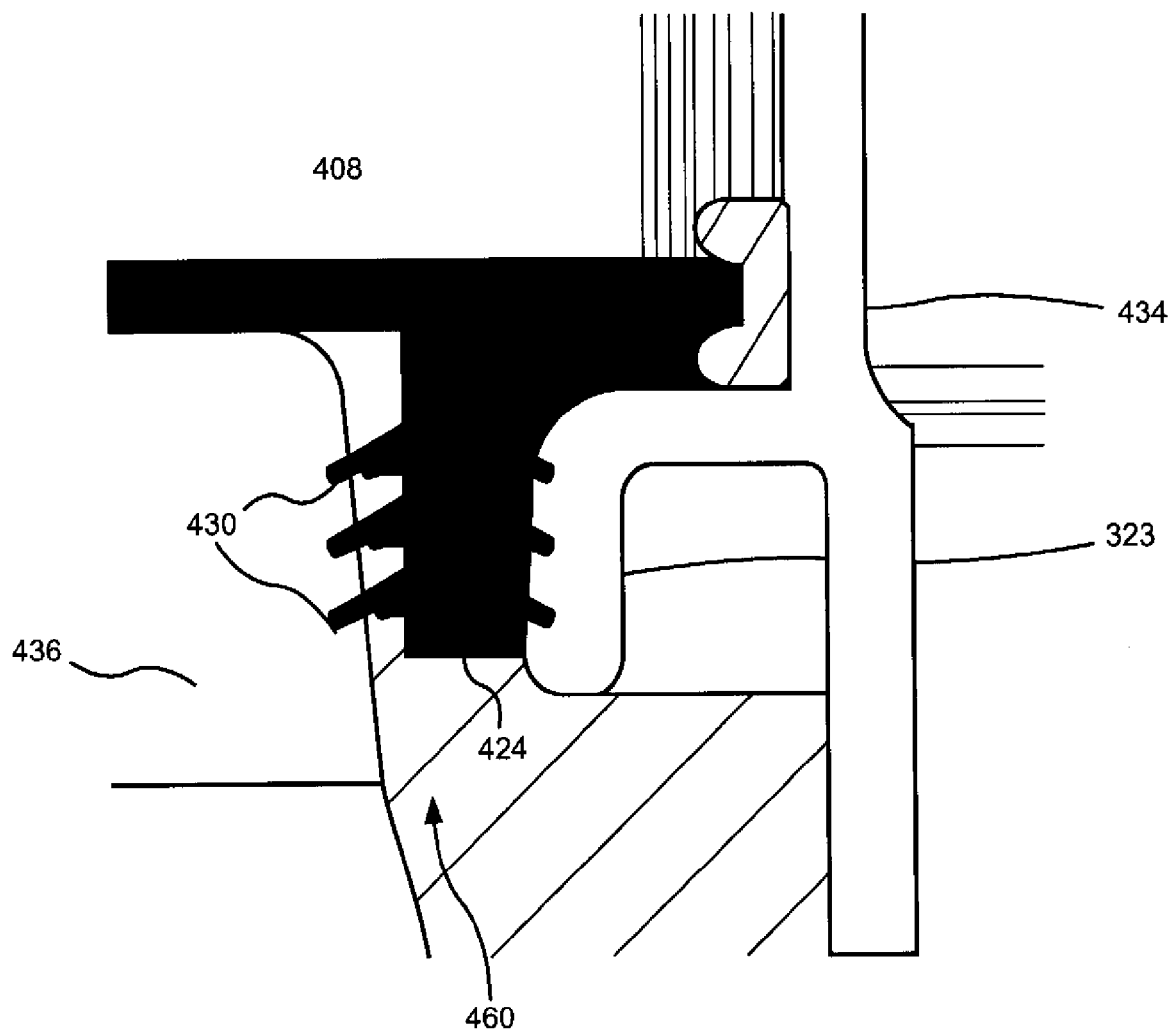
FIG. 12 is a partial cross-sectional view of another embodiment of a quick-drain filter apparatus according to the present invention.

FIG. 12 shows another embodiment of a plug 424, which comprises an axial extension or protrusion from the end plate 408 itself, extending into and plugging the drain passage 460 without the addition of a gasket. The plug 424 contains sealing fins 430 to assist in sealing the passage 460. The fins 430 are thin and flexible protrusions directed upwardly or downwardly, and the flange 422 and housing member 436 are angled slightly to improve the seal. This type of seal is generally more appropriate for coarser filters, where slight bypass of fluid through the drain passage 460 does not result in significant impairment of filter operation. If the secondary gasket 434 is used, as shown, to further seal the clean from the dirty side, a slight bypass will not effect particle separation efficiency, but simply result in bleeding off a small volume of fluid back to the dirty fluid source.

Figure 13:
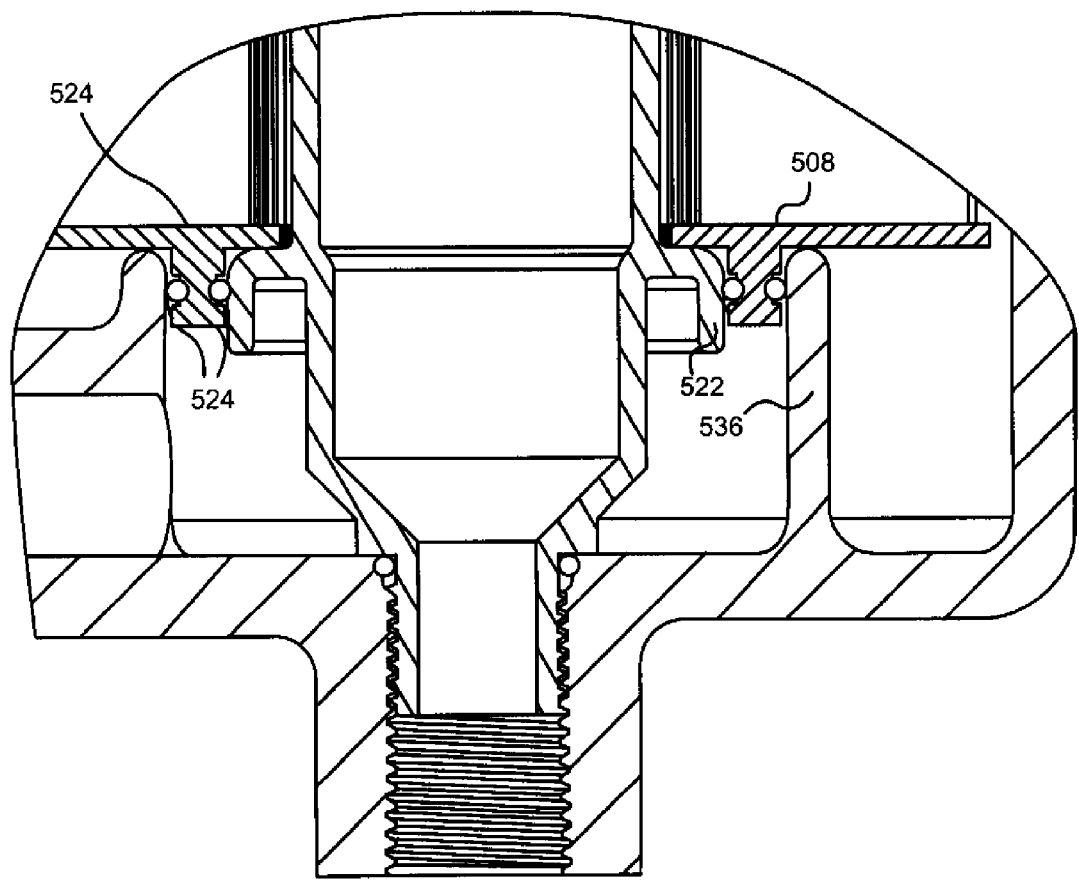
FIG. 13 is a partial cross-sectional view of another embodiment of a quick-drain filter apparatus according to the present invention.

FIG. 13 shows another embodiment of a plug according to the present invention, comprising an annular protrusion 524 extending axially from the end plate 508, containing recesses for placement of 0-rings 526, disposed on the inner and outer sides of the protrusion 524, which seal it against the housing member 536 and flange 522. This type of configuration may be appropriate in low-pressure designs, and can use standard o-rings.

Figure 14:
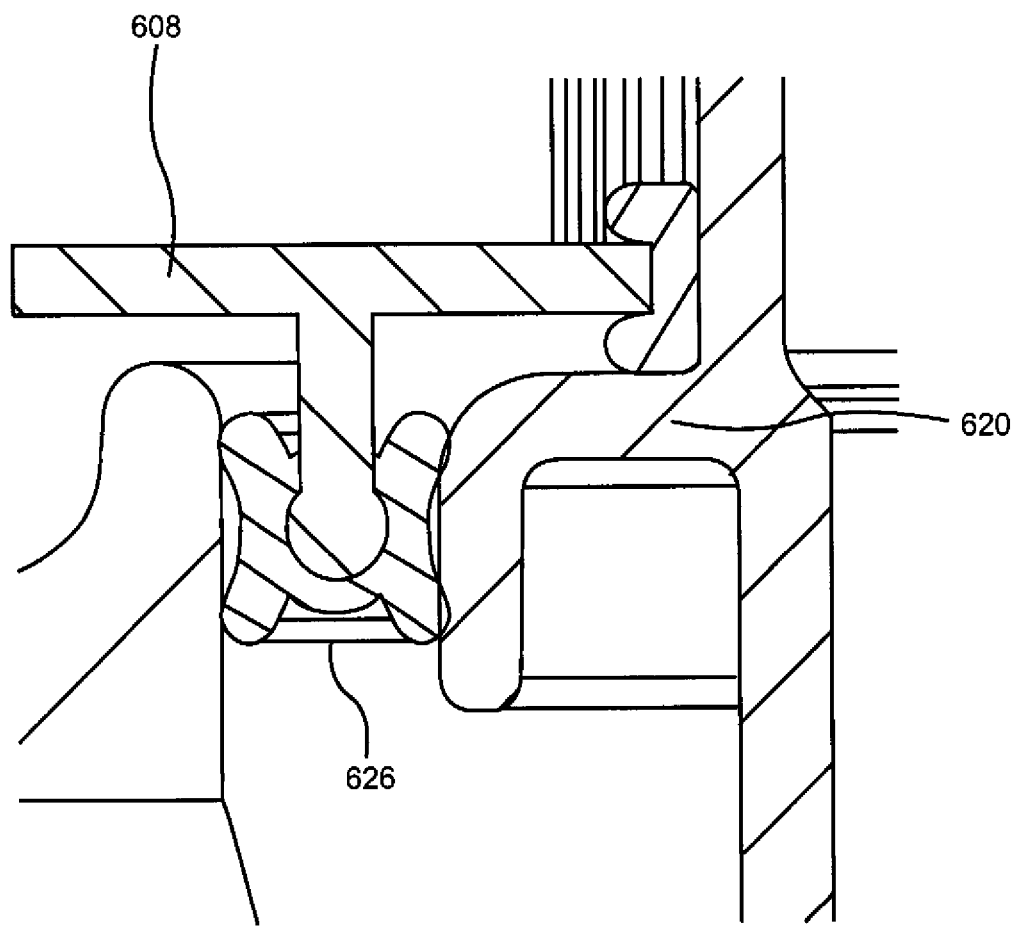
FIG. 14 is a partial cross-sectional view of another embodiment of a quick-drain filter apparatus according to the present invention.

FIG. 14 shows another embodiment of the gasket 626, in that it combines the plug and secondary sealing gaskets, such as the gaskets 326 and 334 shown in FIG. 8. The gasket 626 eliminates the need for a protrusion such as the protrusion 336 shown in FIG. 8, since the gasket 626 itself fills the space between the end plate 608 and plate 620 created by the secondary gasket seal.

Figure 15:
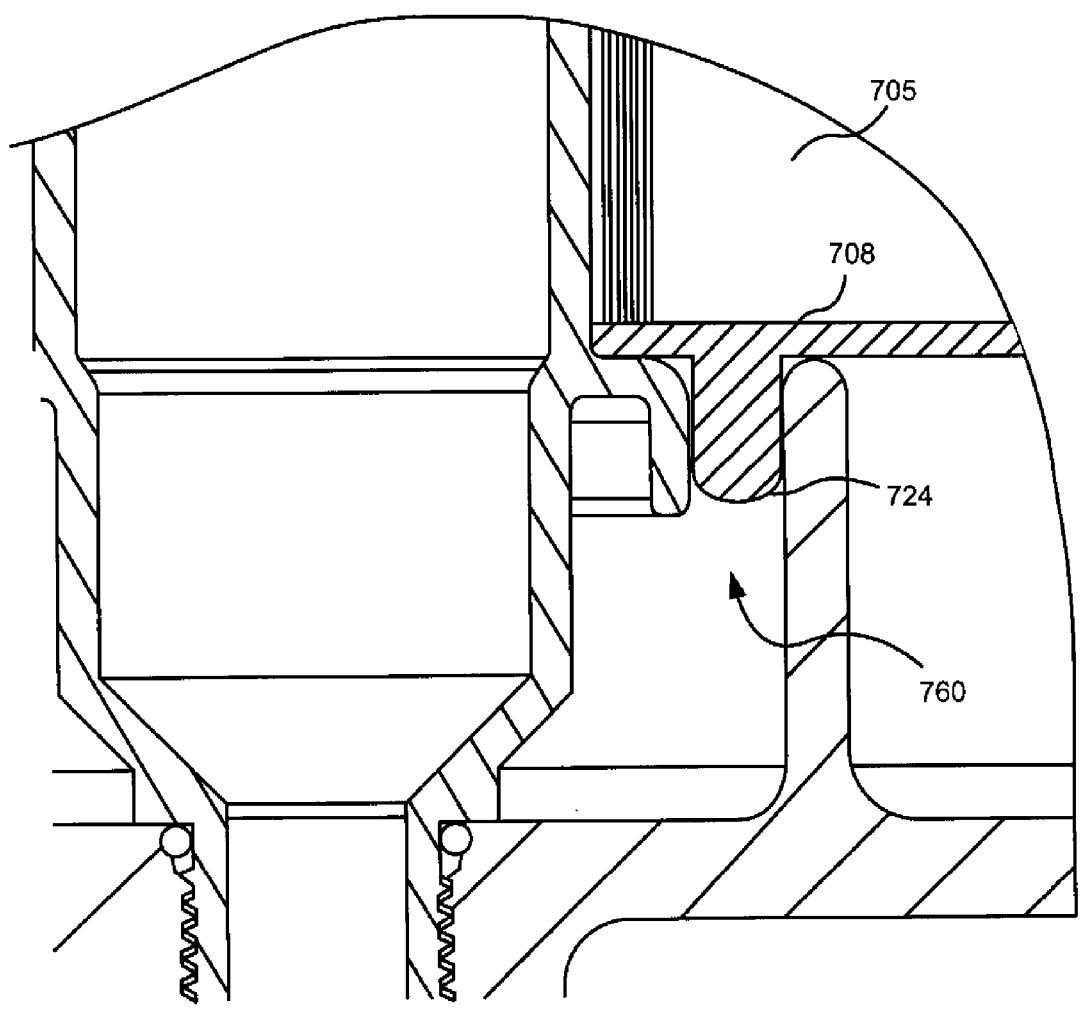
FIG. 15 is a partial cross-sectional view of another embodiment of a quick-drain filter apparatus according to the present invention.

FIG. 15 shows another embodiment of the plug, in which a protrusion 724 extending from the end plate 708 fills and plugs the drain passage 760 without the assistance of fins or gaskets. This can be done, for example, with a urethane foam end plate, which is sometimes used in air and liquid filtration and is molded directly over the end of the element 705, serving to seal the media pleats, if the element 705 is pleated, and create the end plate structure. Such material, or other similar material, is compliant enough to seal directly to the stand pipe and filter housing, and may provide a wiping function similar to that provided by the gasket 334. Other shapes of the protrusion 724 are possible while remaining within the scope of the invention.

Other embodiments of the invention might include a filter cartridge that does not use end plates at all, having media solid enough to retain structural integrity on its own, in which case the plug can be partially or completely formed from the element itself.

Figure 16:
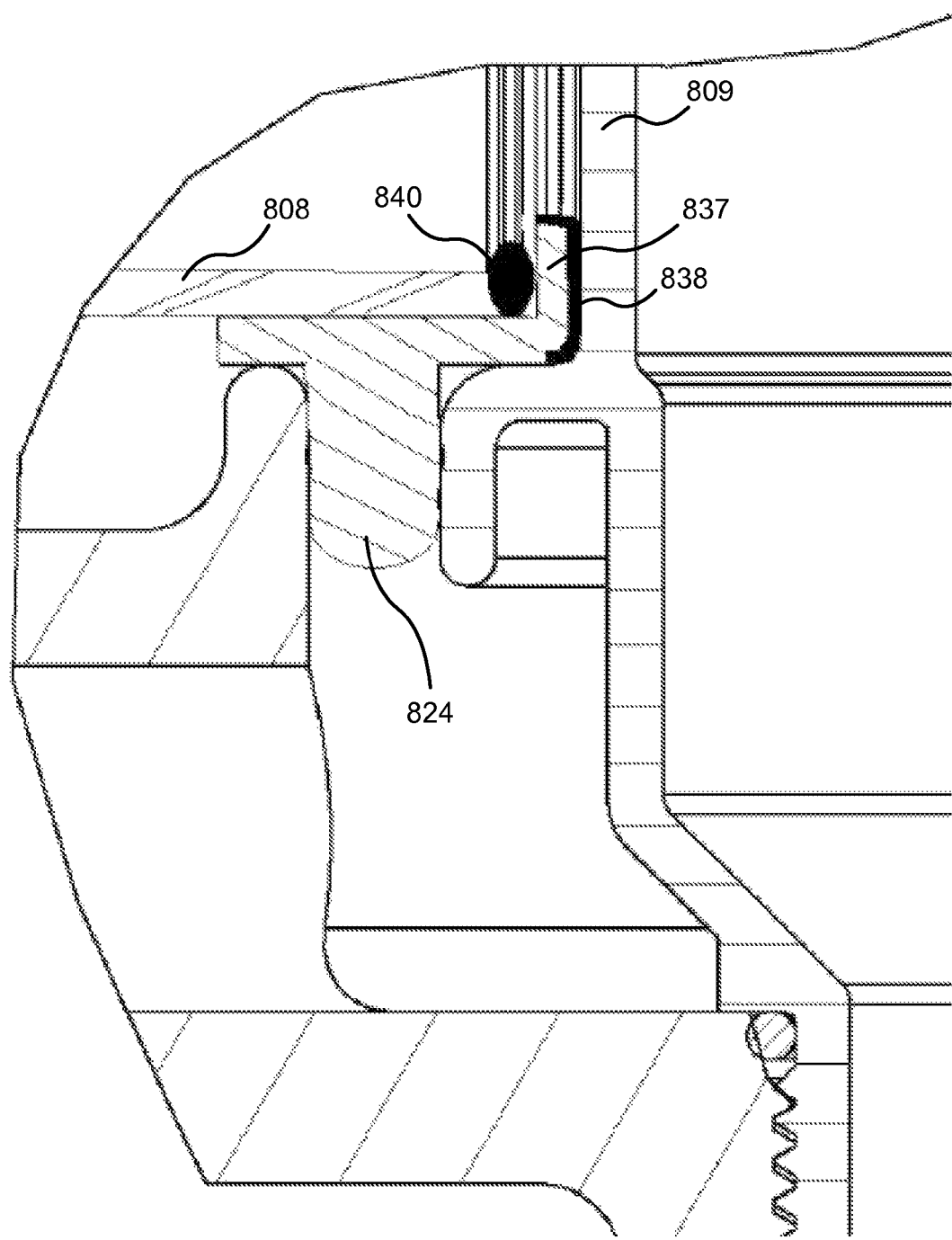
FIG. 16 is a partial cross-sectional view of another embodiment of a quick-drain filter apparatus according to the present invention.
Figure 17:
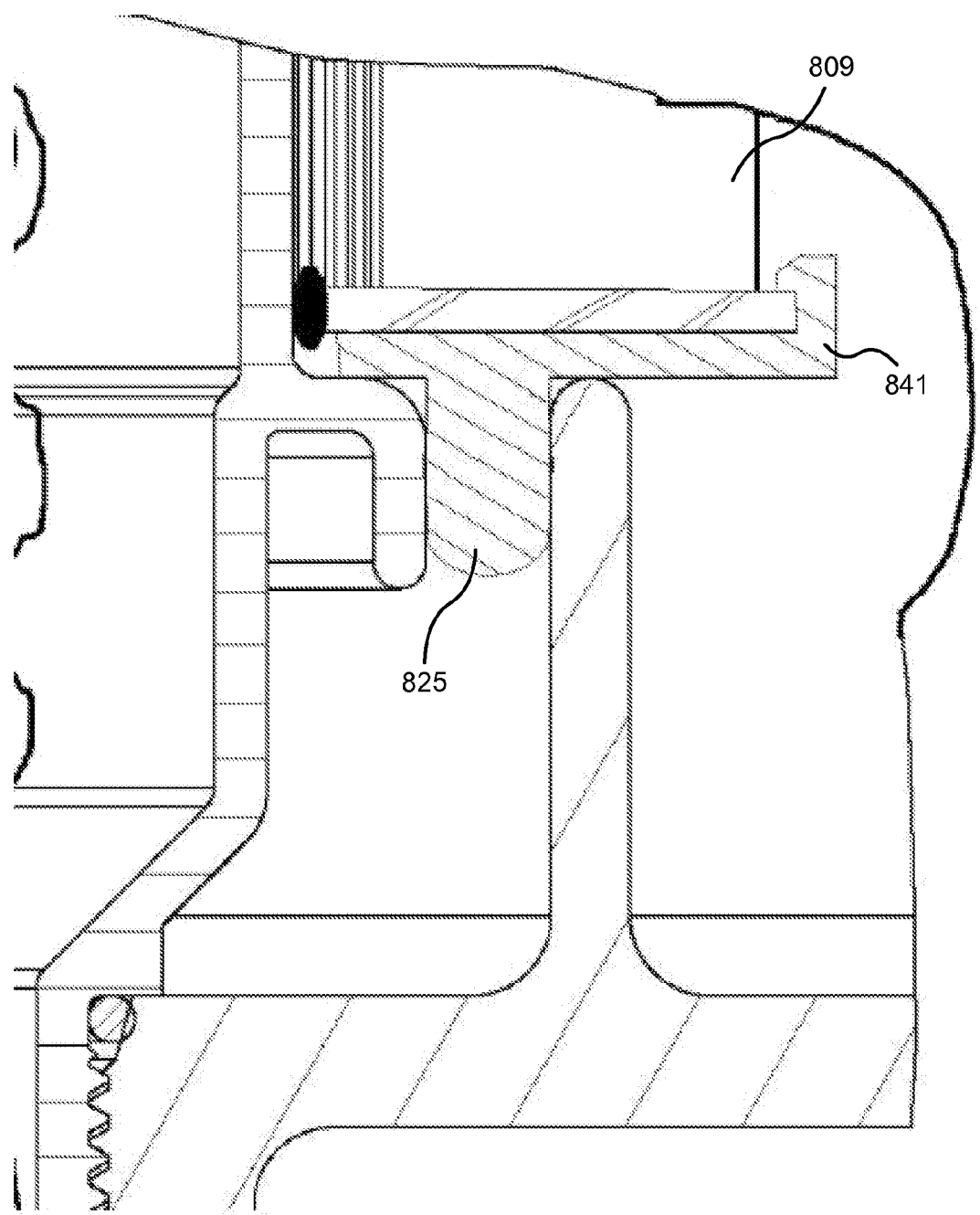
FIG. 17 is a partial cross-sectional view of another embodiment of a quick-drain filter apparatus according to the present invention.

FIG. 16 shows an embodiment of the invention in which the drain passage plug 824 is separate from the filter cartridge, enabling standard filter cartridges with flat end plates, or other shapes not containing the drain plug, to be used in the inventive apparatus. In this embodiment, the plug 824 contains a flange 837 having a sealing gasket 838 against the stand pipe 809, with the end plate 808 sealing against the flange 837 with an o-ring 840 or other seal. FIG. 17 shows an embodiment where the separate plug 825, this one not containing a sealing flange, is clipped to the end plate 808 with an integral clip 841 to clip and seal the end plate 808 directly to the plug 825. The seal could be an o-ring, other elastomeric seal, adhesive seal or snapped with a line-on-line fit to form an interference-fit type seal. Alternatively the clip 841 could simply retain the plug 825 to the endplate 808, and the endplate 808 in turn seals to the standpipe 809. The seal between the endplate 808 and standpipe 809 could be attached to the housing, in which case it remains in place when the filter is removed, or attached to the endplate which comes out with the filter.

The embodiments shown in FIGS. 16 and 17 show the drain passage being plugged separately from the cartridge. If desired, the drain may be plugged at any point along the drain path, either at the drain passage, sump, port, or other location. For purposes of this disclosure and as used herein, any such plug may functionally be considered a plug of the drain passage, since the effect is the same.

Figure 18:
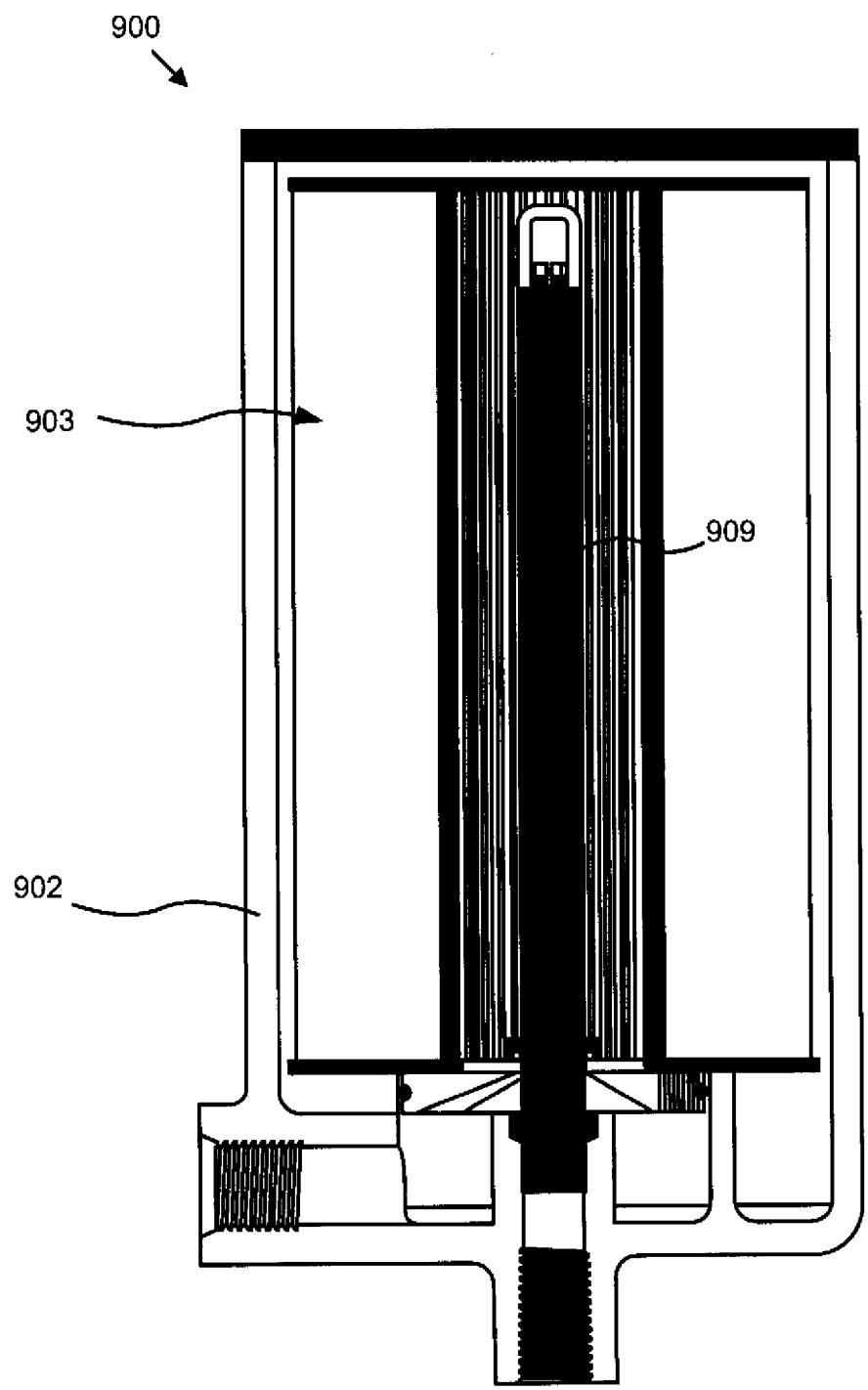
FIG. 18 is a cross-sectional view of another embodiment of a quick-drain filter apparatus according to the present invention.
Figure 18A:
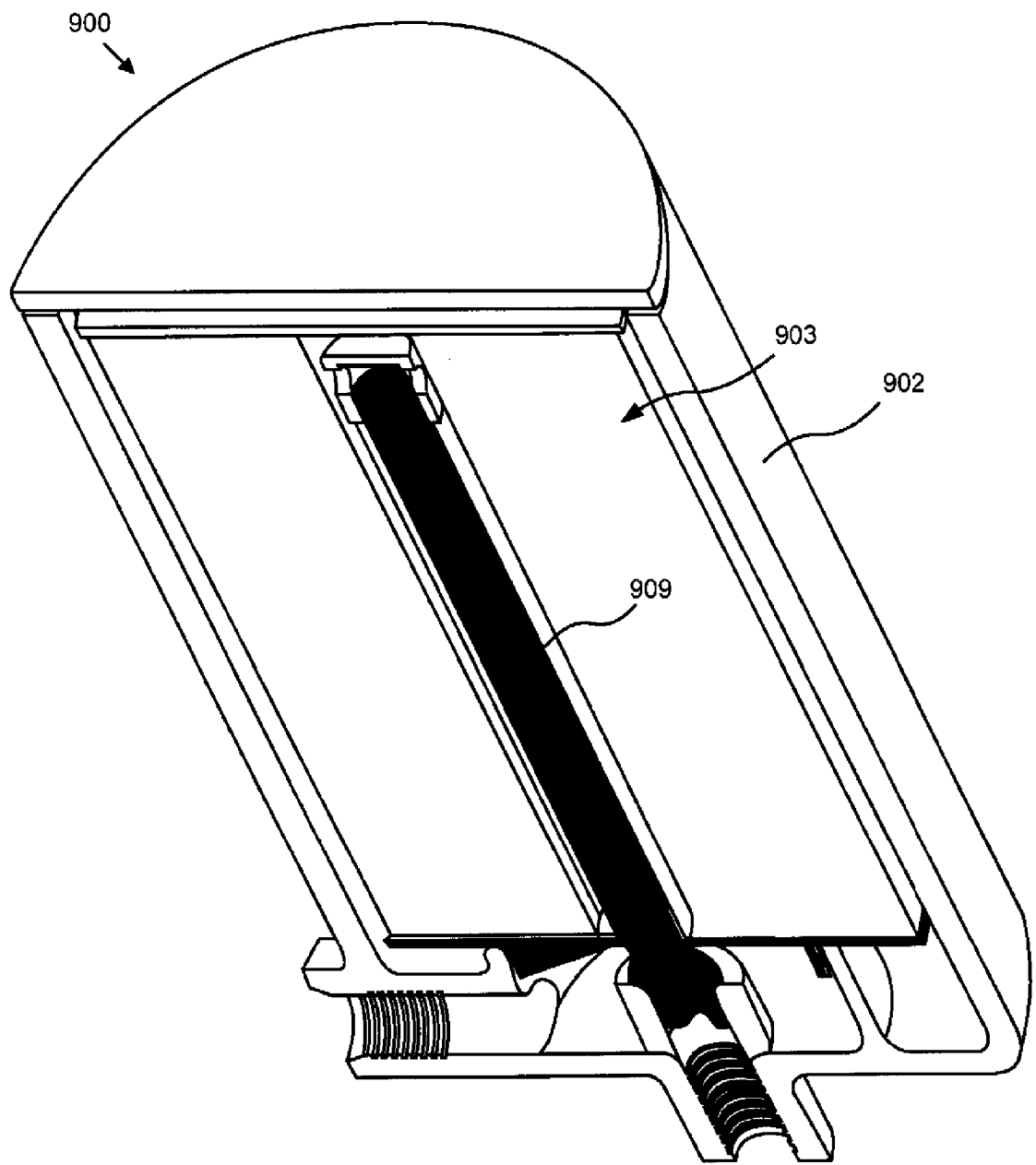
FIG. 18A is a perspective cross-sectional view of the apparatus of FIG. 18.

FIGS. 18 and 18A illustrate an embodiment of a filter apparatus 900 according to the present invention in which the housing 902, filter cartridge 903, and stand pipe 909 are similar to their equivalent structures shown in FIGS. 1 and 2, except that the stand pipe 909 is essentially a straight pipe, rather than the tapered pipe shape of the standpipe 109, and the fact that it has no radial protrusion designed to form a service drain passage (though it may have radial protrusions for other reasons, such as a delimiter for installation in the housing). This configuration is made possible by the type of service drain passage and plug used in the apparatus 900, as further described below.

Figure 19:
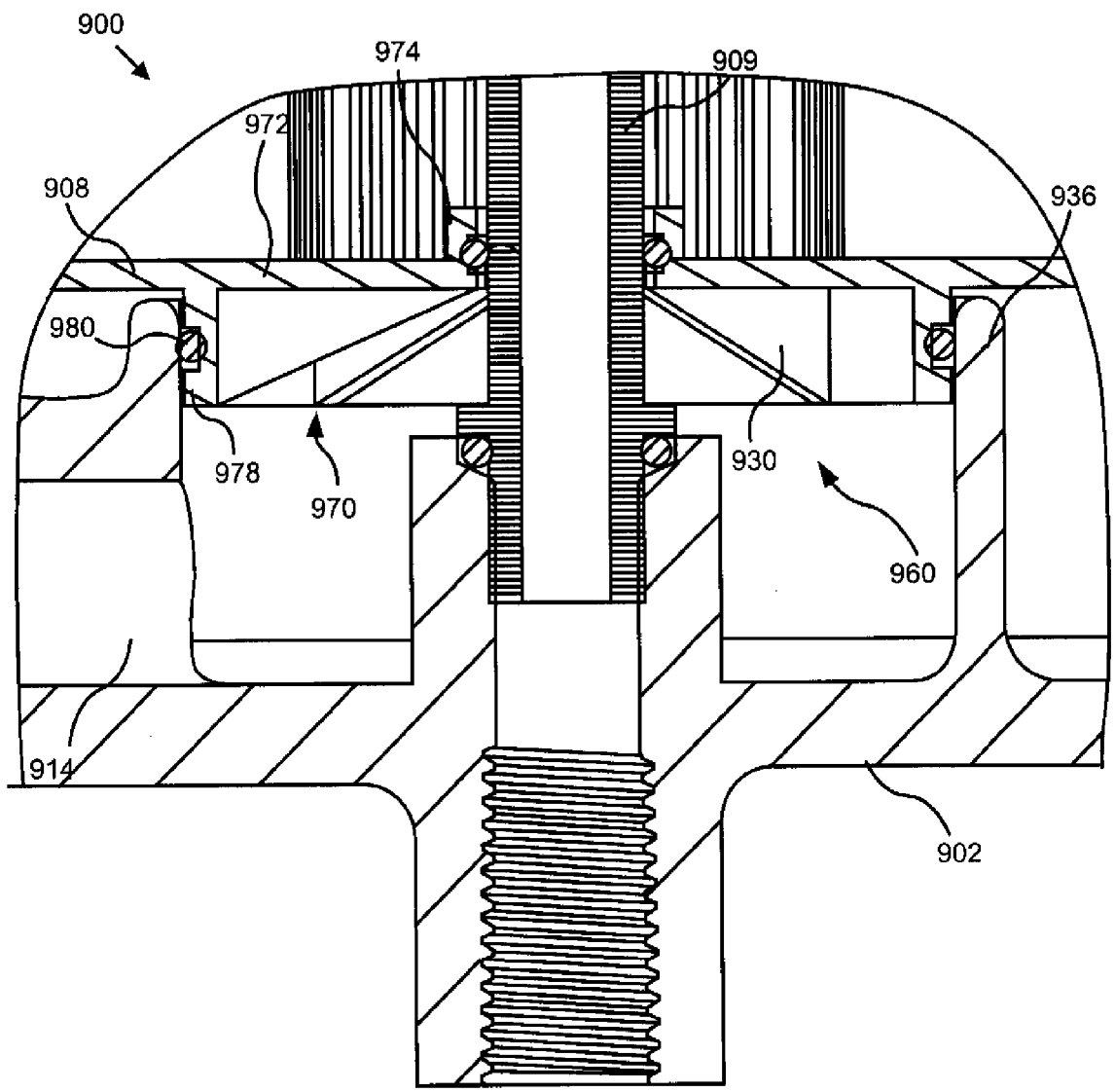
FIG. 19 is a partial cross-sectional view of the apparatus of FIG. 18.

As shown in FIG. 19, the drain passage 960 in the apparatus 900 is not necessarily radially spaced away from the stand pipe 909; rather, the drain passage 960 comprises an open area at the end of the housing 902 into which the stand pipe 909 is inserted, giving the drain passage 960 an annular shape around the stand pipe 909. In this embodiment, it is a passage and sump in one. The drain passage 960 is plugged and separated from the filter cartridge with a plug 970 that is integral with the end plate 908 and which extends axially into the drain passage 960 and radially from the stand pipe 909 to the housing member 936, sealing against each.

The plug 970 comprises an annular plate portion 972, which is coplanar with the rest of the end plate 908. At the inner radius of the plate portion 972, at the stand pipe 909, an axial flange 974 containing an annular gasket 976 extends upwardly, pressing and sealing against the stand pipe 909. At the outer radius of the plate portion 972, at the housing member 936, an axial flange 978 containing an annular gasket 980 extends downwardly, pressing and sealing against the housing member 936. A plurality of support ribs 930 (see also FIG. 21) lend structural strength to the plug 970.

The plug 970 may seal against the stand pipe 909 using a grommet, similar to the sealing arrangement described in connection with FIG. 8, in which case an axial flange is not needed, or it may seal as described in connection with FIG. 16 or equivalents.

The gaskets 976 and 980 may comprise standard o-rings, which may be cheaper than the gaskets and grommets shown and described above. When the filter cartridge is installed in the housing 902, the plug 970, in cooperation with the stand pipe 909, seals the service drain passage 930, and the clean fluid side from the dirty fluid side. The stand pipe 909 is installed in the housing in standard fashion—threads, adhesive, or the like.—as will be apparent to those skilled in the art.

The gasket 976 serves as a wipe to the stand pipe 909 upon installation of the filter cartridge into the housing, keeping contact with and cleaning the stand pipe 909 as it is lowered into place. Upon removal of the cartridge 903, the plug 970 unseals from the housing member 936 and the fluid left in the housing 902 enters the drain passage 960 to exit through the drain port 914.

Figure 20:
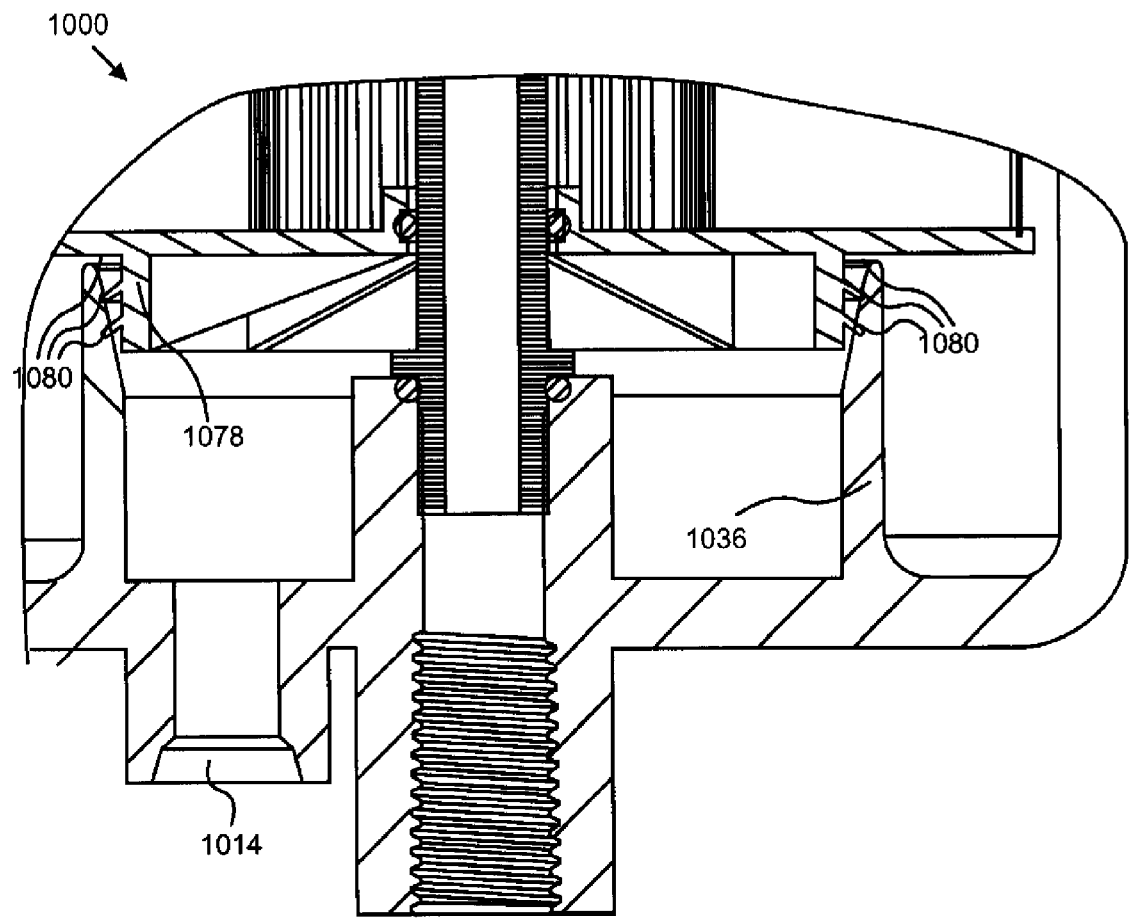
FIG. 20 is a partial cross-sectional view of another embodiment of a quick-drain filter apparatus according to the present invention.

FIG. 20 shows another embodiment of a filter apparatus 1000 according to the present invention in which the outer gasket 980 is replaced with flexible sealing fins 1080 molded into and integral with the flange 1078, the fins 1080 sealing against the housing member 1036, which may be angled in the area of the fins 1080 for a more effective seal. The drain port 1014 is vertically rather than horizontally oriented, which may be desired in some applications.

Figure 21:
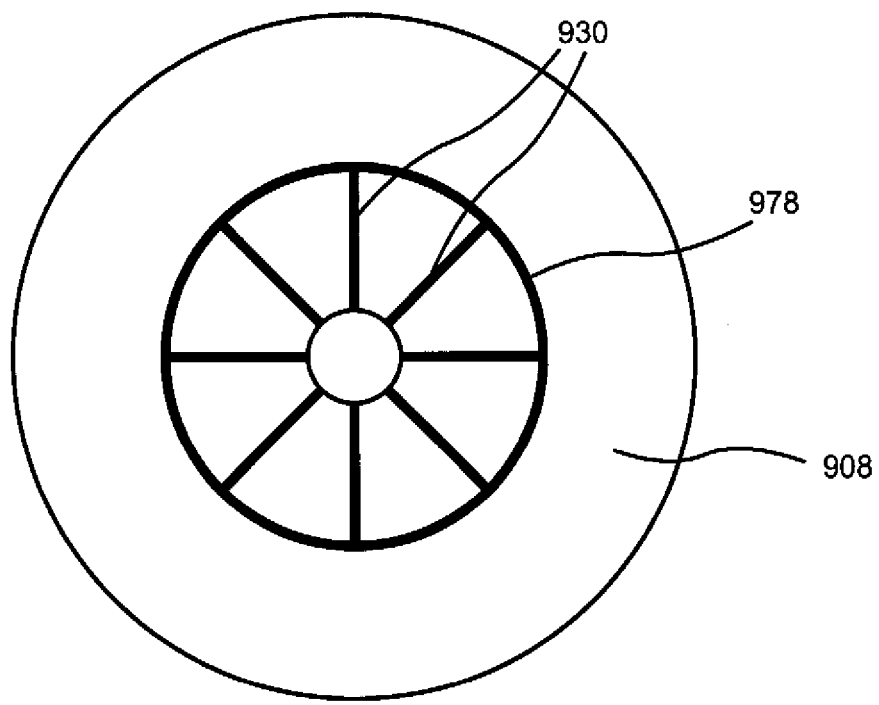
FIG. 21 is a bottom plan view of an end plate according to the present invention.

FIG. 21 shows a bottom view of the support ribs 930.

Figure 22:
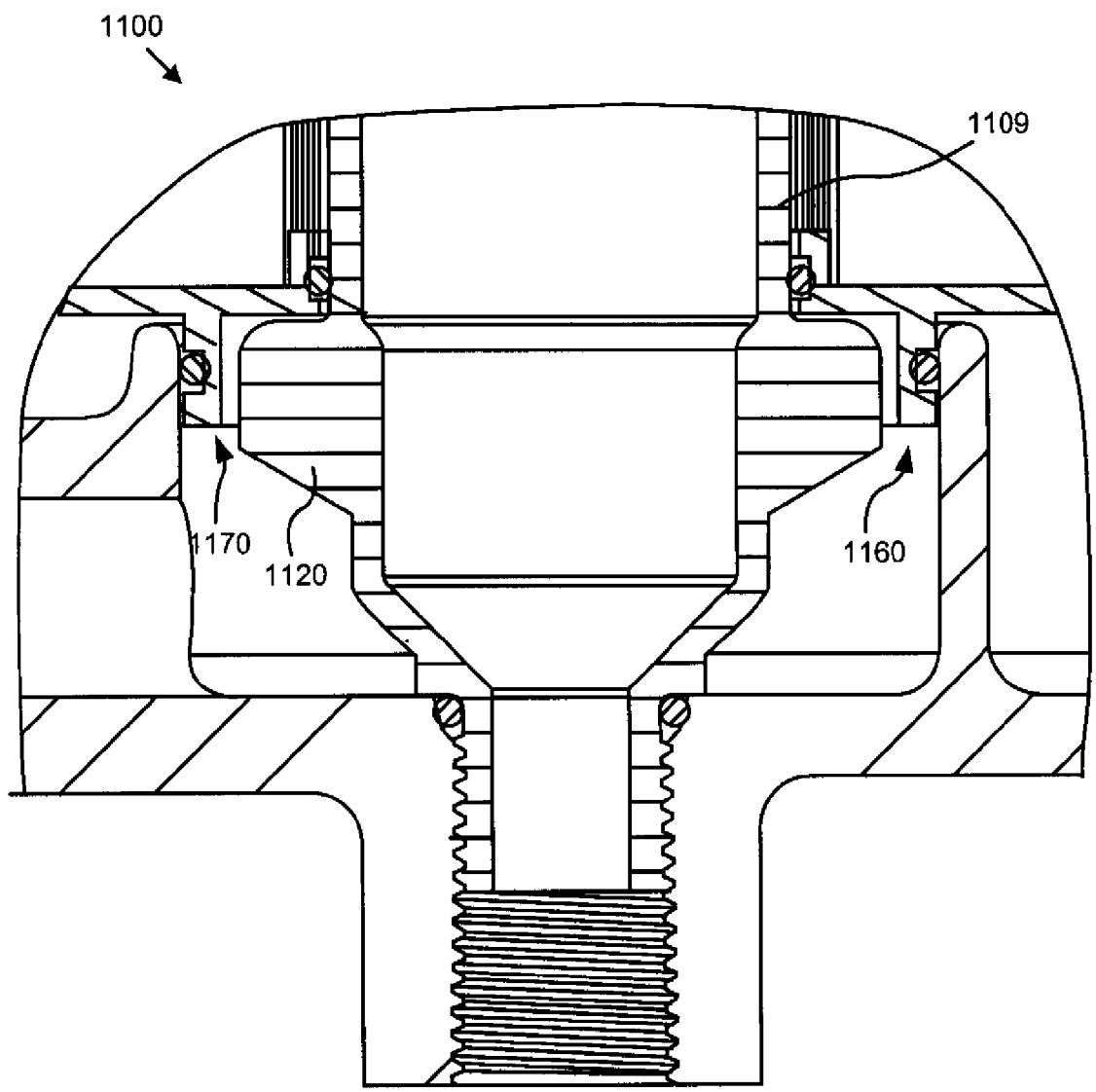
FIG. 22 is a partial cross-sectional view of another embodiment of a quick-drain filter apparatus according to the present invention.

FIG. 22 shows another embodiment 1100 of a filter apparatus according to the present invention. This embodiment differs from the filter 900 primarily in that the stand pipe 1109 is wider, much like the stand pipe 109, and has a radial extension or protrusion 1120 below the end plate 1108. Unlike the protrusion 120, however, the protrusion 1120 does not necessarily seal to the plug 1170 but rather provides structural support for it, providing a similar function to the ribs 930. In this embodiment, the drain passage 1160 is smaller to enable the protrusion 1120 to support the plug 1170, and the plug 1170 itself is commensurately smaller, though in all aspects except the size and extent of the plate portion 1172 the plug 1170 is similar in construction to the plug 970.

Figure 23:
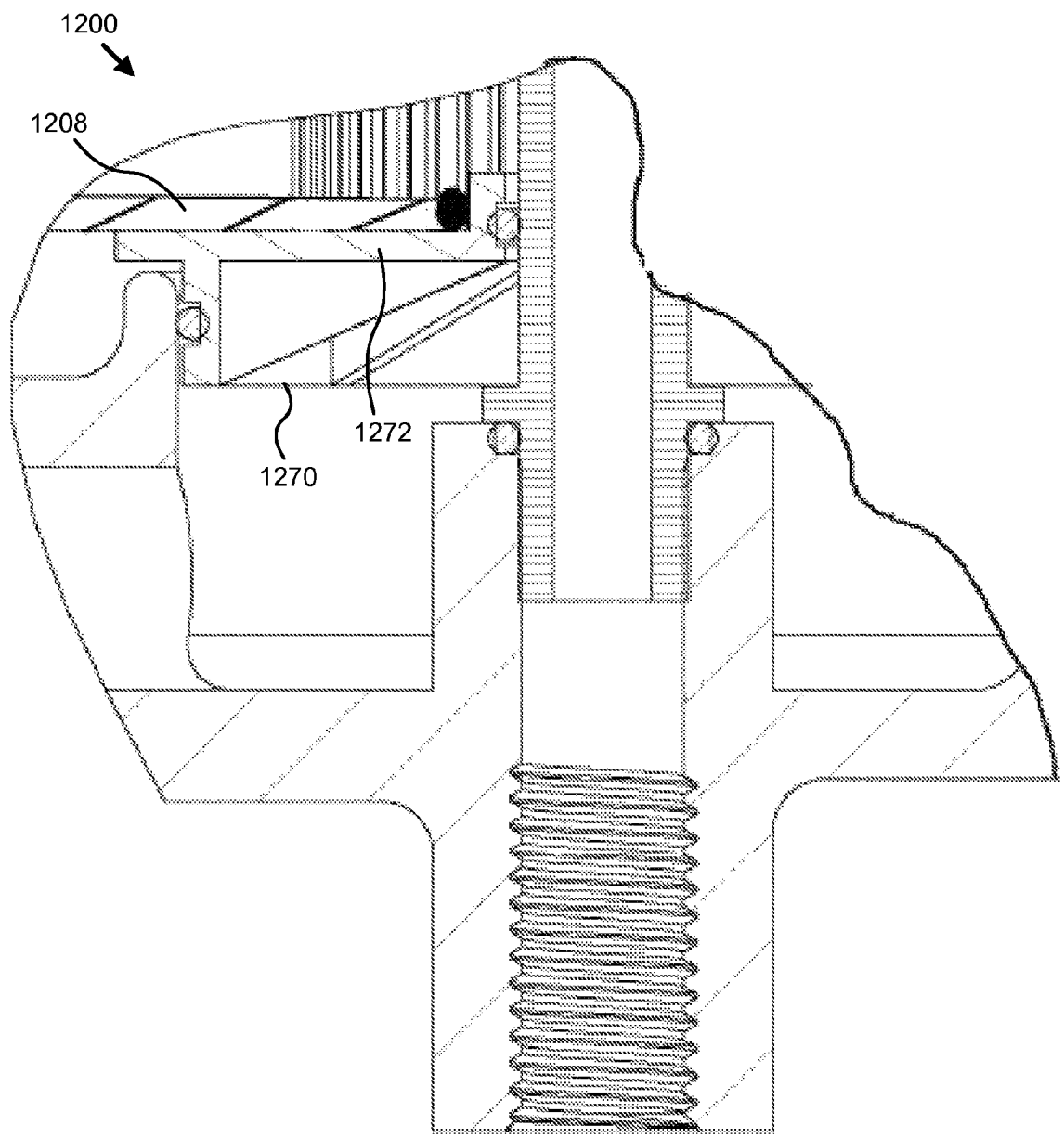
FIG. 23 is a partial cross-sectional view of another embodiment of a quick-drain filter apparatus according to the present invention.

FIG. 23 shows another embodiment 1200 of a filter apparatus according to the invention in which the plug 1270 is separate from the end plate 1208 but is in other aspects similar in construction to the plug 970. Rather than the plate portion 1272 being coplanar with the rest of the end plate 1208, it lies immediately below it, and the end plate 1208 may seal to the plug 1272 in similar fashion to the embodiments described in connection with FIGS. 16 and 17.

The present invention may be embodied in other specific forms without departing from its spirit or essential characteristics. For example, embodiments of the invention that do not require a seal against a stand pipe may be used in filters that do not require a stand pipe to function. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A quick drain fluid filter apparatus comprising:
a filter cartridge having an axial end and an end plate disposed on the axial end;
a plug disposed on the axial end of the cartridge with an inner radius sized such that it abuts a stand pipe extending through the cartridge when the cartridge is installed in a housing; and
at least one gasket disposed between the cartridge and the stand pipe,
the plug extending axially downward from the cartridge and radially outward from the inner radius; and
the plug having an axial flange that extends upward at the inner radius from the axial end of the cartridge and between the cartridge and the stand pipe, and
the axial flange that extends upward containing at least a portion of the gasket.

2. The apparatus of claim 1, wherein the cartridge and plug are substantially cylindrical.

3. The apparatus of claim 2, wherein the plug is configured to directly plug a drain passage in the housing when the cartridge is installed in the housing.

4. The apparatus of claim 3, wherein the plug comprises at least one support rib.

5. The apparatus of claim 3, wherein the plug comprises at least one sealing fin.

6. The apparatus of claim 2, further comprising at least one annular gasket disposed on the plug.

7. The apparatus of claim 6, wherein the annular gasket comprises an o-ring.

8. The apparatus of claim 6, wherein the annular gasket comprises a grommet.

9. The apparatus of claim 6, wherein the annular gasket is disposed on an inner radius of the plug, the gasket being configured to seal the plug against the stand pipe and wipe the stand pipe when the cartridge is installed into the housing.

10. The apparatus of claim 6, wherein the annular gasket is disposed on an outer radius of the plug, the gasket being configured to seal the plug against a portion of the filter housing.

11. The apparatus of claim 1, wherein the cartridge comprises an element and an end plate disposed on an axial end of the element, and wherein the plug is integral with the end plate.

12. The apparatus of claim 1, wherein the cartridge comprises a filter element and an end plate disposed on an axial end of the element, and wherein the plug is separate from the end plate, the end plate being configured to seal against the plug when the cartridge is installed in the housing.

13. A quick drain filter system comprising:
a cylindrical filter element;
a cylindrical interior volume disposed axially through the element;
an end plate disposed on an axial end of the element;
a housing within which the element and end plate are disposed, the housing and element having a common axis;
a stand pipe disposed axially through the housing and configured to extend into the interior volume;
a service drain passage disposed at an axial end of the housing, the drain passage being disposed axially adjacent the end plate; and
a plug disposed on the end plate and configured to plug the drain passage,
at least one annular gasket supported on the plug and disposed between the cylindrical filter element and the stand pipe, and
wherein the plug includes an axial flange that extends upward relative to the end plate and between the filter element and the stand pipe, the axial flange that extends upward containing at least a portion of the gasket.

14. The system of claim 13, wherein the plug seals against the stand pipe on an inner radius and against a portion of the housing on an outer radius.

15. The system of claim 14, wherein the plug comprises a plate extending radially, a first axial flange extending upwardly on the inner radius and a second axial flange extending downwardly on the outer radius.

16. The system of claim 15, wherein the radially extending plate is part of and coplanar with the end plate.

17. The system of claim 15, wherein the at least one annular gasket is disposed on the first axial flange of the plug and another annular gasket is disposed on the second axial flange of the plug.

18. The system of claim 13, further comprising a debris cap disposed on an end of the stand pipe.

19. The system of claim 13, further comprising a support protrusion radially extending from the stand pipe.

20. A quick drain filter apparatus comprising:
a filter cartridge having an end plate with a plug disposed thereon, the plug comprising a first flange extending axially along a filter element and a second flange extending axially away from the filter element;
a housing;
a stand pipe having a common axis with the filter cartridge in an axial direction;
a service drain passage disposed in the housing;
the plug including at least a portion of the first flange and a first gasket disposed between the filter element and the stand pipe; and
the plug including at least a portion of the second flange and a second gasket disposed within the passage in a plugging configuration,
wherein the first flange extends upward relative to the end plate and contains at least a portion of the first gasket.

* * * * *

UNITED STATES PATENT AND TRADEMARK OFFICE
CERTIFICATE OF CORRECTION

| | | |
|---|---|---|
| PATENT NO. | : 8,440,081 B2 | Page 1 of 1 |
| APPLICATION NO. | : 11/835376 | |
| DATED | : May 14, 2013 | |
| INVENTOR(S) | : Wieczorek | |

It is certified that error appears in the above-identified patent and that said Letters Patent is hereby corrected as shown below:

Title page, (*) Notice: After the first paragraph, add the following: --This patent subject to a terminal disclaimer.--.

Signed and Sealed this
Nineteenth Day of November, 2013

Teresa Stanek Rea
*Deputy Director of the United States Patent and Trademark Office*